(12) United States Patent
Yuge et al.

(10) Patent No.: US 12,292,336 B2
(45) Date of Patent: May 6, 2025

(54) BOLOMETER HAVING AN ALIGNMENT LAYER OF CARBON NANOTUBES AND METHOD FOR MANUFACTURING SAME

(71) Applicant: NEC Corporation, Tokyo (JP)

(72) Inventors: Ryota Yuge, Tokyo (JP); Noriyuki Tonouchi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 627 days.

(21) Appl. No.: 17/612,325

(22) PCT Filed: May 21, 2020

(86) PCT No.: PCT/JP2020/020123
§ 371 (c)(1),
(2) Date: Nov. 18, 2021

(87) PCT Pub. No.: WO2020/235636
PCT Pub. Date: Nov. 26, 2020

(65) Prior Publication Data
US 2022/0221346 A1 Jul. 14, 2022

(30) Foreign Application Priority Data

May 23, 2019 (JP) ................................ 2019-096953

(51) Int. Cl.
*G01J 5/22* (2006.01)
(52) U.S. Cl.
CPC ....................................... *G01J 5/22* (2013.01)
(58) Field of Classification Search
None
See application file for complete search history.

(56) References Cited

U.S. PATENT DOCUMENTS 9,851,257 B1  12/2017  Sood et al.
2003/0180472 A1  9/2003  Zhou et al.
(Continued)

FOREIGN PATENT DOCUMENTS

JP  2000-346704  12/2000
JP  2003-227808 A  8/2003
(Continued)

OTHER PUBLICATIONS

Japanese Office Action for JP Application No. 2021-520846 mailed on Dec. 27, 2022 with English Translation.
(Continued)

*Primary Examiner* — Erica S Lin
(74) *Attorney, Agent, or Firm* — Sughrue Mion, PLLC (57) ABSTRACT

An object of the present invention is to provide a bolometer having a high TCR value and a low resistance, and a method for manufacturing the infrared sensor. One aspect of the present embodiment relates to a bolometer comprising: a substrate; a first electrode on the substrate; a second electrode spaced from the first electrode on the substrate; and a carbon nanotube layer electrically connected to the first electrode and the second electrode, wherein the carbon nanotube layer comprises 90% by mass or more of semiconducting carbon nanotubes based on the total amount of carbon nanotubes, and the carbon nanotube layer has an alignment satisfying: fx/fy≥2 where an integrated value f of amplitudes of frequencies from $-1$ $\mu m^{-1}$ to $+1$ $\mu m^{-1}$ in one direction from the center is calculated in an image obtained by performing two-dimensional fast Fourier transform processing on an SEM image of the carbon nanotube layer, and an integrated value for a direction x in which the integrated value f becomes maximum is defined as fx and an integrated value for a direction y perpendicular to the direction x is defined as fy.

14 Claims, 4 Drawing Sheets

(56) References Cited

U.S. PATENT DOCUMENTS

| | | | |
|---|---|---|---|
| 2006/0134326 A1 | 6/2006 | Watanabe et al. | |
| 2010/0065788 A1* | 3/2010 | Momose | C08G 18/673 977/932 |
| 2010/0244655 A1* | 9/2010 | Kim | H01B 1/24 313/346 R |
| 2010/0244864 A1 | 9/2010 | Xiao et al. | |
| 2011/0315981 A1* | 12/2011 | Xu | G01J 5/046 438/54 |
| 2012/0123061 A1* | 5/2012 | Cheng | C08K 3/041 525/523 |
| 2013/0216469 A1 | 8/2013 | Sekino | |
| 2013/0224483 A1 | 8/2013 | Muramatsu | |

FOREIGN PATENT DOCUMENTS

| | | |
|---|---|---|
| JP | 2005-169614 A | 6/2005 |
| JP | 2005-521563 A | 7/2005 |
| JP | 2006-176362 A | 7/2006 |
| JP | 2007-332271 A | 12/2007 |
| JP | 2010-163568 A | 7/2010 |
| JP | 2010-230674 A | 10/2010 |
| JP | 2011-166070 A | 8/2011 |
| JP | 2012-511714 A | 5/2012 |
| JP | 2013-081310 A | 5/2013 |
| JP | 2015-049207 A | 3/2015 |
| WO | 2011/111736 A1 | 9/2011 |
| WO | 2012/049801 A1 | 4/2012 |
| WO | 2012/070527 A1 | 5/2012 |

OTHER PUBLICATIONS

International Search Report for PCT Application No. PCT/JP2020/020123, mailed on Aug. 18, 2020.
Japanese Office Action for JP Application No. 2021-520846 mailed on Oct. 18, 2022 with English Translation.
Shota Ushiba et.al., Macroscopic ensembles of aligned carbon nanotubes in bubble imprints studied by polarized raman microscopy, Journal of Nanomaterials, 2014, vol. 2014, p. 1-7.
Simon T Beyer et.al., Controlled orientation and alignment in films of single-walled carbon nanotubes using inkjet printing, ACS publications, 2012, vol. 28, p. 8753-8759.

* cited by examiner

BOLOMETER HAVING AN ALIGNMENT LAYER OF CARBON NANOTUBES AND METHOD FOR MANUFACTURING SAME

This application is a National Stage Entry of PCT/JP2020/020123 filed on May 21, 2020, which claims priority from Japanese Patent Application 2019-096953 filed on May 23, 2019, the contents of all of which are incorporated herein by reference, in their entirety.

TECHNICAL FIELD

The present invention relates to a bolometer having an alignment layer of carbon nanotubes and a method for manufacturing the same. One embodiment of the present invention relates to an alignment film of carbon nanotubes and a method for producing the same.

BACKGROUND ART

Infrared sensors have a very wide range of applications such as not only monitoring cameras for security, but also thermography for human body, in-vehicle cameras, and inspection of structures, foods, and the like, and are thus actively used in industrial applications in recent years. In particular, development of an infrared sensor capable of obtaining biological information in cooperation with IoT (Internet of Thing) is expected. Generally, bolometers are used for the infrared sensors.

However, the bolometer manufactured by using a complex MEMS (Micro Electro Mechanical Systems) process or vacuum packaging has problem of requiring high cost. In addition, to detect subtle human body temperature changes with a bolometer-type uncooled infrared sensor, further enhancement in sensitivity is required. Thus, development of an infrared sensor that has higher sensitivity and can be manufactured with low cost has been required. To further enhance the sensitivity of the infrared sensor, improvement of the voltage sensitivity and reduction in the total noise are required, and improvement of TCR (Temperature Coefficient Resistance) and reduction in resistance of bolometer materials are also required.

Semiconducting single-walled carbon nanotubes having semiconducting nature and a large band gap are expected to be applied to the bolometer unit to improve TCR. However, single-walled carbon nanotubes typically contain nanotubes with semiconducting properties and nanotubes with metallic properties in a ratio of 2:1, and separation is thus required.

Patent Document 1 suggests applying typical single-walled carbon nanotubes to a bolometer unit, and producing a bolometer by a low-cost thin film process in which a dispersion liquid is prepared by mixing single-walled carbon nanotubes in an organic solvent utilizing their chemical stability and then is cast on an electrode. In this case, TCR is improved to about −1.8%/K by subjecting single-walled carbon nanotubes to annealing treatment in the air.

Patent Document 2 describes that semiconducting single layer nanotubes were extracted with high purity and used in the bolometer section, thereby realizing a higher TCR (−2.6%/K) than the bolometer using conventional VOx (vanadium oxide).

CITATION LIST

Patent Literature

Patent Document 1: WO 2012/049801
Patent Document 2: Japanese Patent Laid-Open No. 2015-49207

SUMMARY OF INVENTION

Technical Problem

However, in the carbon nanotube thin film used in the infrared sensor described in Patent Document 1, metallic carbon nanotubes were present in carbon nanotubes in a mixed state, leading to low TCR at room temperature and a limit in improving the performance of the infrared sensor. In addition, the bolometer using the carbon nanotube thin film used in the infrared sensor described in Patent Document 2 has been also required to further reduce the bolometer resistance to reduce the noise of the infrared sensor.

In view of the foregoing problems, an object of one aspect of the present embodiment is to provide a bolometer having a high TCR value and low resistance, and a method for manufacturing the same. In addition, an object of one aspect of the present embodiment is to provide a carbon nanotube film having a high degree of alignment and a method for manufacturing the same.

As used herein, when description is made about the magnitude of a TCR value, it means the magnitude of the absolute value of the TCR value.

Solution to Problem

According to one aspect of the present embodiment, there is provided a bolometer comprising:

a substrate;

a first electrode on the substrate;

a second electrode spaced from the first electrode on the substrate; and a carbon nanotube layer electrically connected to the first electrode and the second electrode, wherein the carbon nanotube layer comprises 90% by mass or more of semiconducting carbon nanotubes based on the total amount of carbon nanotubes, and the carbon nanotube layer has an alignment satisfying:

$$fx/fy \geq 2$$

where an integrated value f of amplitudes of frequencies from −1 μm$^{-1}$ to +1 μm$^{-1}$ in one direction from the center is calculated in an image obtained by performing two-dimensional fast Fourier transform processing on an SEM image of the carbon nanotube layer, and an integrated value for a direction x in which the integrated value f becomes maximum is defined as fx and an integrated value for a direction y perpendicular to the direction x is defined as fy.

According to one aspect of the present embodiment, there is provided a method for manufacturing a bolometer having a carbon nanotube layer, comprising the steps of:

preparing a carbon nanotube dispersion liquid comprising semiconducting carbon nanotubes in a proportion of 90% by mass or more based on the total amount of carbon nanotubes;

preparing a lower substrate, and an upper substrate having a first side being a straight line;

providing a liquid film of the carbon nanotube dispersion liquid on the lower substrate;

sandwiching the liquid film by the lower substrate and the upper substrate to form an edge of the liquid film along the first side; and moving the upper substrate and/or the lower substrate so that a relative moving direction of the upper substrate with respect to the lower substrate is perpendicular to the first side and toward the inside of the plane of the upper substrate.

Advantageous Effect of Invention

According to one aspect of the present embodiment, a bolometer having a high TCR value and low resistance and a method for manufacturing the same can be provided by the bolometer comprising a carbon nanotube layer having a high degree of alignment.

BRIEF DESCRIPTION OF DRAWINGS

FIGS. 8A1, 8A2, 8B1 and 8B2 are SEM images of the carbon nanotube layers obtained in Example and Comparative Example and images obtained by performing two-dimensional fast Fourier transform processing on the SEM images.

DESCRIPTION OF EMBODIMENTS

<Bolometer and Method for Manufacturing the Same>

One aspect of the bolometer of the present embodiment comprises a substrate, a first electrode on the substrate, a second electrode spaced from the first electrode on the substrate, and a carbon nanotube layer electrically connected to the first electrode and the second electrode. The carbon nanotube layer which constitutes the bolometer preferably contains 90% by mass or more of semiconducting carbon nanotubes based on the total amount of carbon nanotubes; and has an alignment satisfying fx/fy≥2 where an integrated value f of amplitudes of frequencies from −1 μm$^{-1}$ to +1 μm$^{-1}$ in one direction from the center is calculated in an image obtained by performing two-dimensional fast Fourier transform processing on an SEM image of the carbon nanotube layer, and an integrated value for a direction x in which the integrated value f becomes maximum is defined as fx and an integrated value for a direction y perpendicular to the direction x is defined as fy.

As used herein, the term "carbon nanotube layer" is constituted by a plurality of carbon nanotubes which form conductive paths electrically connecting the first electrode and the second electrode, in the bolometer. The plurality of carbon nanotubes is less likely to aggregate even after the surfactant is removed, and thus uniform conductive paths can be obtained. As used herein, the "carbon nanotube layer" may also be referred to as a "carbon nanotube film". As used herein, the carbon nanotube layer formed by the manufacturing method of the present embodiment is also referred to as a "carbon nanotube alignment layer" or an "alignment layer".

Figure 1:
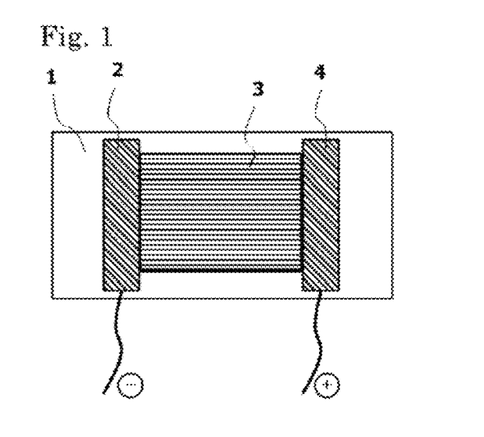
FIG. 1 is a schematic plan view of a bolometer.

FIG. 1 is a schematic view of the bolometer of one example according to the present embodiment. There are a first electrode 2 and a second electrode 4 on a substrate 1, and these electrodes are electrically connected to each other through a carbon nanotube layer 3 positioned therebetween. The first electrode 2 and the second electrode 4 have, for example, as illustrated in FIG. 1, a substantially rectangular shape in a plan view, and are preferably installed so that the long sides oppose each other in parallel. The plurality of carbon nanotubes which constitute the carbon nanotube layer 3 of the present embodiment has high alignment in a direction substantially parallel to the direction of current flow between the electrodes (that is, in a direction in which the longitudinal direction of the carbon nanotubes is substantially perpendicular to the long sides of the electrodes). In the present embodiment, the carbon nanotube layer 3 preferably contains semiconducting carbon nanotubes. The content of the semiconducting carbon nanotubes in the total amount of carbon nanotubes which constitute the carbon nanotube layer 3 is preferably more than 66% by mass, more preferably 90% by mass or more, further preferably 95% by mass or more, and still more preferably 99% by mass or more, and may be 100% by mass.

The bolometer detects the temperature by utilizing the temperature dependence of the electrical resistance caused by light irradiation. Therefore, it can also be used similarly in other frequency regions as long as the temperature changes by light irradiation, and for example, the terahertz region can also be detected. In addition, the detection of the change in electrical resistance caused by temperature change can also be performed not only by the structure of FIG. 1, but also by providing a gate electrode to form a field effect transistor and thereby amplifying the change in resistance value.

First, the carbon nanotube layer which constitutes the bolometer of the present embodiment and the method for manufacturing the same will be described.

The carbon nanotube layer which constitutes the bolometer preferably contains semiconducting carbon nanotubes in a proportion of 90% by mass or more based on the total amount of carbon nanotubes, and has a high degree of alignment, as described above. In the present embodiment, it is preferred to separate metallic carbon nanotubes and semiconducting carbon nanotubes using an electric-field induced layer formation method or the like and to manufacture a carbon nanotube alignment layer using a dispersion liquid having a high concentration of the semiconducting carbon nanotubes, as described below.

Figure 8A:
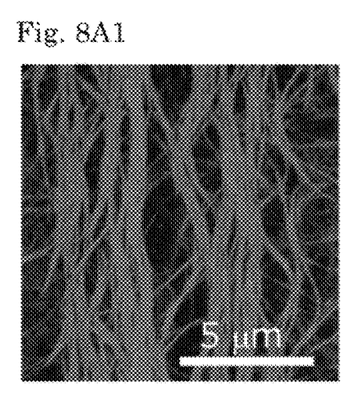
Figure 8A:
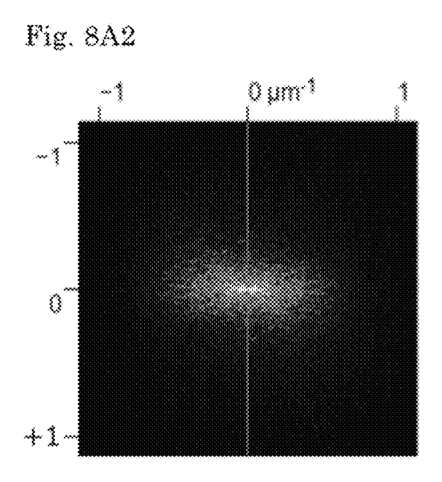

As used herein, the alignment of carbon nanotubes is defined using an image obtained by performing two-dimensional fast Fourier transform processing on a scanning electron microscope photograph (SEM image) of a plane of a carbon nanotube layer (also referred to as an "FFT image"). For example, FIG. 8A1 is an SEM image of the carbon nanotube layer manufactured in Example 1 described below, and FIG. 8A2 is a plane FFT image obtained by performing two-dimensional fast Fourier transform on the SEM image and representing the distribution of unevenness in each direction by a frequency distribution. In FIG. 8A2, the intensity of the FFT image forms a flat oval shape with the abscissa being as a major axis. This means that the carbon nanotubes are aligned in the vertical direction of the image, and it indicates that the flatter the oval shape becomes, the higher the alignment becomes. As used herein, in an FFT image, a value obtained by integrating amplitudes of frequencies from $-1$ $\mu m^{-1}$ to $+1$ $\mu m^{-1}$ in one direction from the center is defined as an integrated value f, a direction in which f becomes maximum is defined as a direction x, and a direction perpendicular to the direction x is defined as a direction y. Then, in the FFT image, a value obtained by integrating amplitudes of frequencies from $-1$ $\mu m^{-1}$ to $+1$ $\mu m^{-1}$ in the direction x from the center is defined as fx, a value obtained by integrating amplitudes of frequencies from $-1$ $\mu m^{-1}$ to $+1$ $\mu m^{-1}$ in the direction y from the center is defined as fy, and a degree of alignment is represented by fx/fy. It means that the larger the value of fx/fy becomes, the higher the degree of alignment becomes. In FIG. 8A2, the horizontal direction corresponds to the direction x. In the FFT image of the carbon nanotube alignment layer of the present embodiment, it is preferred to satisfy fx/fy≥2, and more preferred to satisfy fx/fy≥2.4.

The SEM image which is the original image of the above FFT image needs to have visible unevenness for calculation by Fourier transform, and from the viewpoint of observing carbon nanotubes, the visual field range is preferably about 0.05 to 10 μm in vertical and horizontal directions.

The bolometer including the above carbon nanotube layer which has high alignment exhibits a high TCR value and low resistance. A plurality of carbon nanotubes is aligned in the same direction, which results in a large contact area between nanotubes and increased conductive paths. As a result, it is considered that a large resistance change is achieved against temperature change and further, the resistance is reduced.

In the plurality of carbon nanotubes that connect the first electrode and the second electrode, the number of carbon nanotubes between the electrodes (the number density of the carbon nanotubes in the carbon nanotube layer 3) is preferably 1 nanotube/$\mu m^2$ to 1,000 nanotubes/$\mu m^2$, more preferably 10 nanotubes/$\mu m^2$ to 500 nanotubes/$\mu m^2$, and more preferably 50 nanotubes/$\mu m^2$ to 300 nanotubes/$\mu m^2$. In one embodiment, it may preferably be 10 nanotubes/$\mu m^2$ to 100 nanotubes/$\mu m^2$. When the number is less than 1 nanotube/$\mu m^2$, it may be difficult to form conductive paths. When it is 1,000 nanotubes/$\mu m^2$ or less, a reduction in the nature of TCR is likely to be suppressed even when a small amount of metallic carbon nanotubes is contained. For example, the number of carbon nanotubes can be calculated by counting and averaging the number of carbon nanotubes per area at random 50 spots (each having a region of 1 μm×1 μm) on the carbon nanotube layer using AFM.

The thickness of the carbon nanotube layer is not particularly limited, and is, for example, preferably 1 nm or more, more preferably 10 nm or more, further preferably 30 nm or more, and preferably 100 μm or less, more preferably 10 μm or less, further preferably 5 μm or less, and still more preferably 1 μm or less.

The method for manufacturing the bolometer of the present embodiment comprises the steps of:
  preparing a carbon nanotube dispersion liquid comprising semiconducting carbon nanotubes in a proportion of 90% by mass or more based on the total amount of carbon nanotubes;
  preparing a lower substrate, and an upper substrate having a first side being a straight line;
  providing a liquid film of the carbon nanotube dispersion liquid on the lower substrate;
  sandwiching the liquid film by the lower substrate and the upper substrate to form an edge of the liquid film along the first side; and
  moving the upper substrate and/or the lower substrate so that a relative moving direction of the upper substrate with respect to the lower substrate is perpendicular to the first side and toward the inside of the plane of the upper substrate.

Here, one example of the apparatus used to form the carbon nanotube alignment layer of the present embodiment (hereinafter, also referred to as a "carbon nanotube alignment apparatus") will be described with reference to the drawings.

Figure 2:
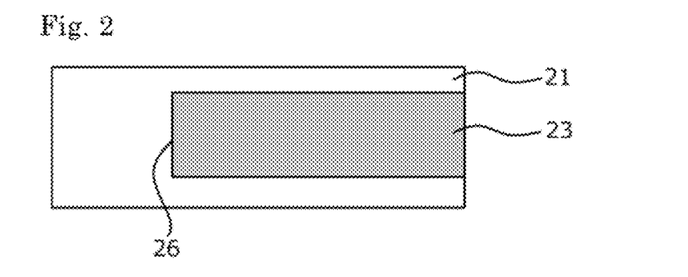
FIG. 2 is a schematic view (top view) of a carbon nanotube alignment apparatus.
Figure 3:
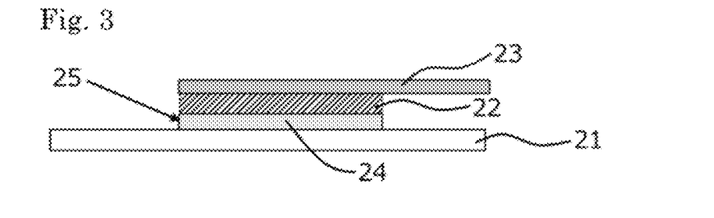
FIG. 3 is a schematic view (side view) of the carbon nanotube alignment apparatus.

FIG. 2 and FIG. 3 are respectively the top view and the side view of the carbon nanotube alignment apparatus. The carbon nanotube alignment apparatus at least includes a lower substrate 21 and an upper substrate 22 wherein planes thereof are opposed to each other. The upper substrate 22 has a first side 26 which is a straight line. The upper substrate 22 and the lower substrate 21 are not particularly limited in the shapes thereof, and are preferably rectangular or square plane substrates. The surfaces of the lower substrate 21 and the upper substrate 22 opposing to each other are preferably in parallel.

In one aspect of the present embodiment, the upper substrate 22 may include a moving jig 23 for moving the upper substrate 22. The shape, size, attachment position, and the like of the moving jig are not particularly limited. In the alignment apparatus of FIG. 2 and FIG. 3, as one example, the plane of the moving jig 23 is attached so as to cover the upper surface of the upper substrate 22, and one side of the moving jig 23 overlaps the first side 26 of the upper substrate 22. Further, the moving jig 23 has a grip portion in the moving direction of the upper substrate 22.

Although not illustrated, the carbon nanotube alignment apparatus may have a spacer for keeping the distance between the opposing surfaces of the lower substrate 21 and the upper substrate 22 constant.

When a surface of a substrate has a contact angle relative to water (water contact angle) larger than 0°, the substrate may be appropriately used as the lower substrate 21 and the upper substrate 22, but if the water contact angle is obtuse, it causes a problem that the alignment of CNT is less likely to occur because the evaporation rate of water near an edge 25 of the liquid film does not increase and a capillary flow toward the edge 25 of the liquid film is less likely to be caused. Therefore, the water contact angle is typically more than 0° to 90°, and preferably more than 0° to 60°. The water contact angle is preferably within the above range under the environmental conditions (temperature, humidity, etc.) during the manufacturing of the carbon nanotube alignment layer. The water contact angle may be determined by using the static method defined in JIS R3257; 1999.

The material constituting the lower substrate 21 and the upper substrate 22 may be an inorganic material or an organic material (a polymer, a resin, etc.). Examples of the inorganic material include glass, Si, $SiO_2$, and SiN. As the organic material, plastic, rubber, and the like are preferred and examples thereof include parylene, polyethylene terephthalate, and polymethyl methacrylate. One substrate may contain two or more of these materials.

In consideration of the ease of deposition of carbon nanotubes, the substrate may be coated with a material that modifies the surface of these materials. As the coating, one having insulating properties and insoluble in water is preferably used, and examples thereof include polyimide, polyamide, aramid, polyurethane, acryl resins, fluorine resins, parylene, and epoxy resins. The material constituting the lower substrate 21 and the material constituting the upper substrate 22 may be the same or different.

In the formation of the carbon nanotube layer, when the liquid film is formed on the lower substrate 21 by, for example, dropwise adding a carbon nanotube dispersion liquid, 3-aminopropyltriethoxysilane (APTES), polylysine, and the like may be pre-adsorbed on the lower substrate 21 so that carbon nanotubes can be easily adsorbed thereon.

The lower substrate 21 may be used as an electrode substrate 1 of the bolometer. When used as the substrate of the bolometer, a substrate having at least an element forming surface with insulating properties or semiconducting properties can be used, and a substrate having an element forming surface with insulating properties is particularly preferred.

The plane size of the upper substrate 22 is preferably smaller than the plane size of the lower substrate, and it is more preferred that the first side 26 of the upper substrate 22 has a size small enough to fall within the plane of the lower substrate 21.

The distance between the opposing surfaces of the upper substrate 22 and the lower substrate 21 may be appropriately adjusted, and for example, it is preferably 0.1 µm or more, and more preferably 1 µm or more, and the upper limit is preferably 500 µm or less, more preferably 200 µm or less, and further preferably 50 µm or less.

The method for manufacturing a carbon nanotube alignment film using the carbon nanotube alignment apparatus will be described below.

First, the carbon nanotube dispersion liquid 24 is provided on the lower substrate 21 to form a liquid film. The amount to be provided on the lower substrate is not particularly limited, and is, for example, preferably 1 µL or more, and more preferably 10 µL or more, and the upper limit is preferably 1 mL or less, more preferably 500 µL or less, further preferably 200 µL or less, and still more preferably 100 µL or less. The method for providing the carbon nanotube dispersion liquid on the lower substrate is not particularly limited, and examples thereof include a dropping method, inkjet, spray coating, and dip coating, and a dropping method is particularly preferred.

Next, the liquid film of the carbon nanotube dispersion liquid is sandwiched by the lower substrate 21 and the upper substrate 22 so as to be in contact with the first side 26 of the upper substrate, thereby forming the edge 25 of the liquid film along the first side 26 (FIG. 3). The edge 25 of the liquid film may be formed along the whole first side 26 or may be formed along a part of the first side 26.

Figure 4:
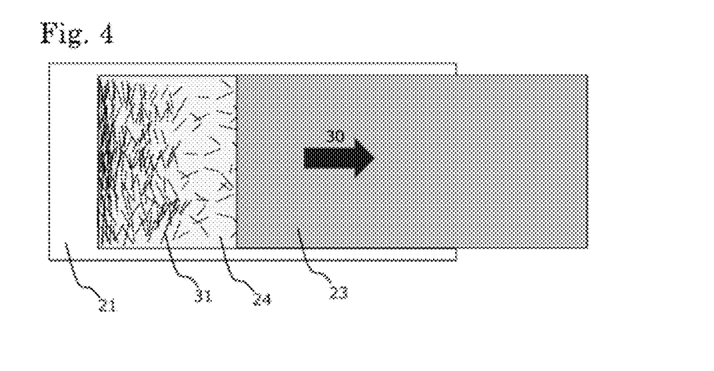
FIG. 4 is a view (top view) of the carbon nanotube alignment apparatus in the middle of the production of an alignment layer.
Figure 5:
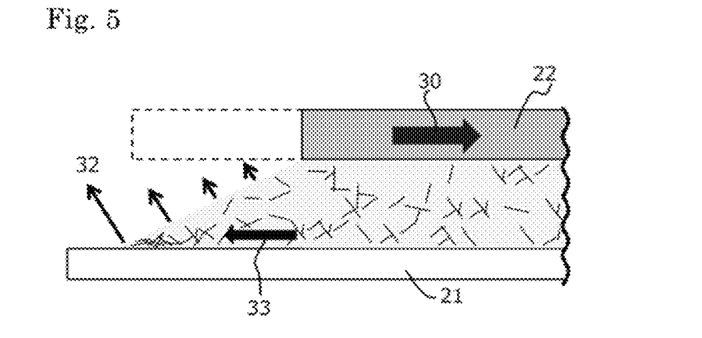
FIG. 5 is a view (side view) of the carbon nanotube alignment apparatus in the middle of the production of the alignment layer.

Subsequently, the upper substrate 22 is moved in a direction perpendicular to the first side 26 and toward the inside of the plane of the upper substrate 22 (the moving direction 30 of FIG. 4). FIG. 4 and FIG. 5 schematically illustrate the middle of a process of forming a carbon nanotube alignment layer using the carbon nanotube alignment apparatus. FIG. 4 is a top view and FIG. 5 is a side view. As illustrated in these figures, the upper substrate 22 is moved by pulling the moving jig 23 in the moving direction 30. As illustrated in FIG. 5, the evaporation rate of the solvent of the carbon nanotube dispersion liquid 24 (e.g., water and heavy water) becomes higher and the solvent dries faster as closer to the edge 25 of the liquid film, along with the moving of the upper substrate 22. At this time, in the carbon nanotube dispersion liquid 24, a capillary flow 33 is caused in a direction opposite to the moving direction 30 of the upper substrate, and carbon nanotubes 31 are moved in the direction of the edge 25. Then, the present inventors have found that the carbon nanotubes 31 arrived at the periphery of the edge are deposited while being aligned in substantially parallel to the edge 25, that is, in substantially parallel to the first side 26 of the upper substrate 22 (the vertical direction of FIG. 4).

The speed of moving the upper substrate 22 may be adjusted depending on the environmental conditions during manufacturing, the distance between the upper substrate 22 and the lower substrate 21 (the thickness of the liquid film), the temperature of the substrate, and the like, without limitation. For example, the moving speed of the upper substrate 22 is preferably 0.001 mm/second to 0.05 mm/second. The temperature of the substrate is, for example, preferably 10° C. to 50° C., and more preferably 20° C. to 40° C. The relative humidity is preferably 15% RH to 50% RH. The environmental pressure is preferably standard atmospheric pressure (1013.25 hPa) or less.

When the upper substrate 22 is moved, a spacer may be used to keep the distance between the upper substrate 22 and the lower substrate 21 constant. For example, by installing a spacer between the moving jig 23 and the lower substrate 21, the upper substrate 22 can be moved while keeping the distance between the upper substrate 22 and the lower substrate 21 constant.

In the above aspect, an example where the lower substrate is fixed and not moved during the upper substrate is moved, is described, but the lower substrate may be moved in a direction opposite to the moving direction of the upper substrate or the lower substrate may be moved while fixing the upper substrate. That is, the upper substrate and/or the lower substrate are/is moved so that a relative moving direction of the upper substrate with respect to the lower substrate is perpendicular to the first side and toward the inside of the plane of the upper substrate.

Since the carbon nanotube dispersion liquid contains a nonionic surfactant and the like, as described below, the nonionic surfactant and the like are preferably removed by moving the upper substrate 22 and then firing in the atmosphere at preferably 150 to 400° C., and more preferably 200 to 400° C. As a result of these operations, an alignment film of the carbon nanotubes 31 is formed on the lower substrate 21.

Figure 6:
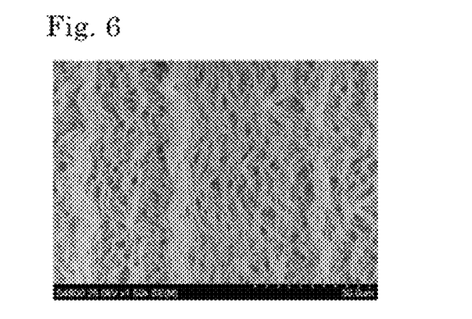
FIG. 6 is a scanning electron microscope image of the carbon nanotube alignment layer produced in Example.

The carbon nanotubes in the carbon nanotube alignment layer obtained by the above method exhibit high alignment (see Example and FIG. 6). In particular, the bolometer having the carbon nanotube alignment layer obtained by the above method using the carbon nanotube dispersion liquid having a high content of semiconducting carbon nanotubes exhibits a high TCR value and a low resistance value. In addition, the carbon nanotube alignment layer can be formed with low cost and ease, as described above.

In the present embodiment, the carbon nanotube alignment layer, formed on the lower substrate 21, can be stripped from the lower substrate 21 and used as a carbon nanotube alignment film (simply referred to as the "alignment film"). After the alignment film is produced, the alignment film may be printed on the electrode substrate 1 of the bolometer by a transfer method, a microprinting method, or the like. As mentioned above, the carbon nanotube alignment film of the present embodiment can be used in transfer printing, thus having advantages of reduction in the number of steps, cost reduction, and excellent mass productivity, in manufacturing of a bolometer.

(Carbon nanotube dispersion liquid)

The carbon nanotube dispersion liquid used in the manufacturing of the carbon nanotube alignment layer described above (simply referred to as the "dispersion liquid") will be described in detail below. The carbon nanotube dispersion liquid contains carbon nanotubes and a surfactant.

As the carbon nanotubes, single-walled, double-walled, and multi-walled carbon nanotubes may be used, but when semiconducting carbon nanotubes are separated, single-walled or few-walled (for example, double-walled or triple-walled) carbon nanotubes are preferred, and single-walled carbon nanotubes are more preferred. The carbon nanotubes preferably comprise single-walled carbon nanotubes in an amount of 80% by mass or more, and more preferably 90% by mass or more (including 100% by mass).

The diameter of the carbon nanotubes is preferably between 0.6 and 1.5 nm, more preferably 0.6 nm to 1.2 nm, and further preferably 0.7 to 1.1 nm, from the viewpoint of increasing the band gap to improve TCR. In one embodiment, the diameter of 1 nm or less may be particularly preferred in some cases. When the diameter is 0.6 nm or more, the manufacture of carbon nanotubes becomes much easier. When the diameter is 1.5 nm or less, the band gap is easily maintained in an appropriate range and a high TCR can be obtained.

As used herein, the diameter of the carbon nanotubes means that when the carbon nanotubes on the substrate are observed using an atomic force microscope (AFM) and the diameter thereof is measured at about 50 positions, 60% or more, preferably 70% or more, optionally preferably 80% or more, more preferably 100% thereof is within a range of 0.6 to 1.5 nm. It is preferred that 60% or more, more preferably 70% or more, optionally preferably 80% or more, and more preferably 100% thereof be within a range of 0.6 to 1.2 nm, and further preferably within a range of 0.7 to 1.1 nm. In one embodiment, 60% or more, preferably 70% or more, optionally preferably 80% or more, and more preferably 100% thereof is within a range of 0.6 to 1 nm.

The length of the carbon nanotubes is preferably in the range of 100 nm to 5 μm because dispersion is easy and the carbon nanotubes are easily provided on the substrate to form a liquid film. Also, from the viewpoint of conductivity of the carbon nanotubes, the length is preferably 100 nm or more. When the length is 5 μm or less, aggregation on the substrate is easily suppressed. The length of the carbon nanotubes is more preferably 500 nm to 3 μm, and further preferably 700 nm to 1.5 μm.

As used herein, the length of the carbon nanotubes means that, when at least 50 carbon nanotubes are observed using an atomic force microscope (AFM) and enumerated to measure the distribution of the length of the carbon nanotubes, 60% or more, preferably 70% or more, optionally preferably 80% or more, and more preferably 100% thereof is within a range of 100 nm to 5 μm. It is preferred that 60% or more, preferably 70% or more, optionally preferably 80% or more, and more preferably 100% thereof be within a range of 500 nm to 3 μm. It is more preferred that 60% or more, preferably 70% or more, optionally preferably 80% or more, and more preferably 100% thereof be within a range of 700 nm to 1.5 μm.

When the diameter and length of the carbon nanotubes are within the above range, the influence of semiconductive properties becomes large and a large current value can also be obtained when the semiconducting carbon nanotubes are used, and thus, a high TCR value is likely to be obtained when the carbon nanotubes are used in a bolometer.

As one aspect, in the carbon nanotube layer of the bolometer, the content of the semiconducting carbon nanotubes, preferably the semiconducting single-walled carbon nanotubes, in the carbon nanotubes is preferably more than 66% by mass, preferably 90% by mass or more, more preferably 95% by mass or more, and further preferably 99% by mass or more (including 100% by mass).

As the carbon nanotubes, those from which surface functional groups and impurities such as amorphous carbon, catalysts, and the like have been removed by performing a heat treatment under an inert atmosphere, in a vacuum may be used. The heat treatment temperature may be appropriately selected and is preferably 800 to 2000° C., and more preferably 800 to 1200° C.

The surfactant contained in the carbon nanotube dispersion liquid is preferably a nonionic surfactant. The nonionic surfactant has a weak interaction with carbon nanotubes unlike ionic surfactants, and can be easily removed after applying the dispersion liquid on the substrate. Thus, a stable carbon nanotube conductive path can be formed and an excellent TCR value can be obtained. Since the nonionic surfactant having a long molecular length can have a large distance between carbon nanotubes when the dispersion liquid is provided on the substrate, and is less likely to reaggregate after evaporation of water, the alignment state can be maintained while keeping a moderate distance, which is preferred. Alignment makes the contact area between nanotubes large, increases conductive paths, and reduces the resistance. As a result, not only the large resistance change is achieved against the temperature change, but also the resistance is reduced.

The nonionic surfactant may be appropriately selected, and it is preferred to use nonionic surfactants constituted by a hydrophilic portion which is not ionized and a hydrophobic portion such as an alkyl chain, for example, nonionic surfactants having a polyethylene glycol structure exemplified by polyoxyethylene alkyl ethers, and alkyl glucoside based nonionic surfactants, singly or in combination. As such a nonionic surfactant, polyoxyethylene alkyl ether represented by Formula (1) is preferably used. In addition, the alkyl moiety may have one or a plurality of unsaturated bonds.

$$C_nH_{2n+1}(OCH_2CH_2)_mOH \quad (1)$$

wherein, n=preferably 12 to 18, and m=10 to 100, and preferably 20 to 100.

In particular, a nonionic surfactant specified by polyoxyethylene (n) alkyl ether (wherein n=20 or more and 100 or less, and the alkyl chain length is C12 or more and C18 or less) such as polyoxyethylene (23) lauryl ether, polyoxyethylene (20) cetyl ether, polyoxyethylene (20) stearyl ether, polyoxyethylene (10) cetyl ether, polyoxyethylene (10) oleyl ether, polyoxyethylene (10) cetyl ether, polyoxyethylene (10) stearyl ether, polyoxyethylene (20) oleyl ether, polyoxyethylene (100) stearyl ether is more preferred. In addition, N,N-bis[3-(D-gluconamido)propyl]deoxycholamide, n-dodecyl-β-D-maltoside, octyl β-D-glucopyranoside, and digitonin may also be used.

As the nonionic surfactant, polyoxyethylene sorbitan monostearate (molecular formula: $C_{64}H_{126}O_{26}$, trade name: Tween 60, manufactured by Sigma-Aldrich, etc.), polyoxyethylene sorbitan trioleate (molecular formula: $C_{24}H_{44}O_6$, trade name: Tween 85, manufactured by Sigma-Aldrich, etc.), octylphenol ethoxylate (molecular formula: $C_{14}H_{22}O(C_2H_4O)_n$, n=1 to 10, trade name: Triton X-100, manufactured by Sigma-Aldrich, etc.), polyoxyethylene (40) isooctylphenyl ether (molecular formula: $C_8H_{17}C_6H_{40}$  $(CH_2CH_{20})_{40}H$, trade name: Triton X-405, manufactured by Sigma-Aldrich, etc.), poloxamer (molecular formula: $C_5H_{10}O_2$, trade name: Pluronic, manufactured by Sigma-Aldrich, etc.), polyvinyl pyrrolidone (molecular formula: $(C_6H_9NO)_n$, n=5 to 100, manufactured by Sigma-Aldrich, etc.) may be used.

The molecular length of the nonionic surfactant is preferably 5 to 100 nm, more preferably 10 to 100 nm, and further preferably 10 to 50 nm. When the molecular length is 5 nm or more, in particular, 10 nm or more, the distance between carbon nanotubes can be appropriately held and aggregation is easily suppressed after the dispersion liquid is provided on the substrate. The molecular length of 100 nm or less is preferred from the viewpoint of constructing a network structure.

The method for obtaining a dispersion liquid is not particularly limited, and known methods can be applied. For example, a carbon nanotube mixture, a dispersion medium, and a nonionic surfactant are mixed to prepare a solution containing carbon nanotubes, and this solution is subjected to sonication to disperse the carbon nanotubes, thereby preparing a carbon nanotube dispersion liquid (micelle dispersion solution). The dispersion medium is not particularly limited, as long as it is a solvent that allows carbon nanotubes to disperse and suspend during the separation step, and for example, water, heavy water, an organic solvent, an ionic liquid, or a mixture thereof may be used, and water and heavy water are preferred. In addition to or instead of the sonication mentioned above, a technique of dispersing carbon nanotubes by a mechanical shear force may be used. The mechanical shearing may be performed in a gas phase. In a micelle dispersion aqueous solution of the carbon nanotubes and the nonionic surfactant, the carbon nanotubes are preferably in an isolated state. Thus, if necessary, bundles, amorphous carbon, impurity catalysts, and the like may be removed using an ultracentrifugation treatment. During the dispersion treatment, the carbon nanotubes can be cut, and the length thereof can be controlled by changing the grinding conditions of the carbon nanotubes, ultrasonic output, ultrasonic treatment time, and the like. For example, the aggregate size can be controlled by grinding the untreated carbon nanotubes using tweezers, a ball mill, or the like. After these treatments, the length can be controlled to 100 nm to 5 μm using an ultrasonic homogenizer by setting the output to 40 to 600 W, optionally 100 to 550 W, 20 to 100 KHz, the treatment time to 1 to 5 hours, preferably 1 to 3 hours. When the treatment time is shorter than 1 hour, the carbon nanotubes may be hardly dispersible depending on the conditions, and may remain almost the original length in some cases. From the viewpoint of shortening the dispersion treatment time and reducing the cost, the treatment time is preferably 3 hours or less. The present embodiment may also have the advantage of ease of adjustment of cutting due to use of a nonionic surfactant.

Dispersion and cutting of the carbon nanotubes generate a surface functional group at the surface or the end of the carbon nanotube. Functional groups such as carboxyl group, carbonyl group, and hydroxyl group are generated. When the treatment is performed in a liquid phase, a carboxyl group and a hydroxyl group are generated, and when the treatment is performed in a gas phase, a carbonyl group is generated.

The concentration of the surfactant in the liquid comprising heavy water or water and a nonionic surfactant mentioned above is preferably from the critical micelle concentration to 10% by mass, and more preferably from the critical micelle concentration to 3% by mass. The concentration equal to or less than the critical micelle concentration (preferably less than the critical micelle concentration) is not preferred because dispersion is impossible. When the concentration is 10% by mass or less, a sufficient density of carbon nanotubes can be applied after separation, while reducing the amount of surfactant. As used herein, the critical micelle concentration (CMC) refers to the concentration serving as an inflection point of the surface tension measured by, for example, changing the concentration of an aqueous surfactant solution using a surface tensiometer such as a Wilhelmy surface tensiometer at a constant temperature. As used herein, the "critical micelle concentration" is a value under atmospheric pressure at 25° C.

The concentration of the carbon nanotubes in the above cutting and dispersion step (the weight of the carbon nanotubes/(the total weight with the dispersion medium and the surfactant)×100) is not particularly limited, and for example, may be 0.0003 to 10% by mass, preferably 0.001 to 3% by mass, and more preferably 0.003 to 0.3% by mass.

The dispersion liquid obtained through the aforementioned cutting and dispersion step may be used as it is in the separation step mentioned below, or steps such as concentration and dilution may be performed before the separation step. Separation of the carbon nanotubes can be performed by, for example, the electric-field-induced layer formation method (ELF method: see, for example, K. Ihara et al. J. Phys. Chem. C. 2011, 115, 22827 to 22832 and Japanese Patent No. 5717233, which are incorporated herein by reference). One example of the separation method using the ELF method will be described. Carbon nanotubes, preferably single-walled carbon nanotubes are dispersed by a nonionic surfactant, and the dispersion liquid is put into a vertical separation apparatus, and then a voltage is applied to the electrodes arranged above and below, so that the carbon nanotubes are separated by free flow electrophoresis. The mechanism of separation can be inferred as follows. When the carbon nanotubes are dispersed by the nonionic surfactant, it is inferred that the micelle of the semiconducting carbon nanotubes has a negative zeta potential, whereas the micelle of the metallic carbon nanotubes has slightly zeta potential or is barely charged. Thus, when an electric field is applied to the carbon nanotube dispersion liquid, the micelle of the semiconducting carbon nanotubes is electrophoresed toward the anode (+) direction, and the micelle of the metallic carbon nanotubes is electrophoresed toward the cathode (−) direction by the effects of the difference between the zeta potentials, and the like. Eventually, the layer in which the semiconducting carbon nanotubes are concentrated is formed near the anode, and the layer in which the metallic carbon nanotubes are concentrated is formed near the cathode in the separation tank. The voltage for separation may be appropriately set in consideration of the composition of the dispersion medium, the charge amount of carbon nanotubes, and the like, and is preferably 1 V or more and 200 V or less, and more preferably 10 V or more and 200 V or less. It is preferably 100 V or more from the viewpoint of shortening the time for the separation step. It is preferably 200 V or less from the viewpoint of suppressing the generation of bubbles during separation and maintaining the separation efficiency. The purity is improved by repeating separation. The same separation procedure may be performed by resetting the dispersion liquid after separation to the initial concentration. As a result, the purity can be further increased.

Through the aforementioned dispersion and cutting step and separation step of the carbon nanotubes, a dispersion liquid in which the semiconducting carbon nanotubes having the desired diameter and length are concentrated can be obtained. As used herein, the carbon nanotube dispersion liquid in which semiconducting carbon nanotubes are concentrated may be referred to as the "semiconducting carbon nanotube dispersion liquid". The semiconducting carbon nanotube dispersion liquid obtained through the separation step means the dispersion liquid comprising the semiconducting carbon nanotubes in an amount of more than 66% by mass, preferably 80% by mass or more, more preferably 90% by mass or more, more preferably 95% by mass or more, and further preferably 99% by mass or more (the upper limit may be 100% by mass) based on the total amount of carbon nanotubes. The separation tendency of the metallic and semiconducting carbon nanotubes can be analyzed by microscopic Raman spectroscopy and ultraviolet-visible near-infrared absorptiometry.

The centrifugation treatment may be performed to remove the bundles, amorphous carbon, metal impurities, and the like in the carbon nanotube dispersion liquid after the aforementioned dispersion and cutting step of the carbon nanotubes and before the separation step. The centrifugal acceleration may be appropriately adjusted, and is preferably 10000×g to 500000×g, more preferably 50000×g to 300000×g, and optionally 100000×g to 300000×g. The centrifugation time is preferably 0.5 hours to 12 hours, and more preferably 1 to 3 hours. The centrifugation temperature may be appropriately adjusted, and is preferably 4° C. to room temperature, and more preferably 10° C. to room temperature.

In one embodiment, it may be preferred that ultracentrifugation treatment is not performed. In particular, bundle formation is easily suppressed in embodiments in which the dispersion liquid comprising carbon nanotubes comprises a nonionic surfactant, in particular, a nonionic surfactant having a large molecular length, and thus, there are also advantages that the number of process steps can be reduced and the cost can be reduced without performing the ultracentrifugation treatment.

When the above carbon nanotube dispersion liquid after separation is used as the carbon nanotubes to be provided on the lower substrate to form the carbon nanotube alignment layer, the concentration of the surfactant in the dispersion liquid may be appropriately controlled. The concentration of the surfactant of the carbon nanotube dispersion liquid when providing the carbon nanotube dispersion liquid on the lower substrate is preferably the critical micelle concentration to about 5% by mass, more preferably 0.001% by mass to 3% by mass, and particularly preferably 0.01 to 1% by mass to suppress the reaggregation and the like after providing the carbon nanotube dispersion liquid on the lower substrate.

The zeta potential of the semiconducting carbon nanotube dispersion liquid is preferably +5 mV to −40 mV, more preferably +3 mV to −30 mV, and further preferably +0 mV to −20 mV. The zeta potential of +5 mV or less is preferred because it means that the content of the metallic carbon nanotubes is low. If the zeta potential is higher than −40 mV, separation is difficult in the first place. Here, the zeta potential of the semiconducting carbon nanotube dispersion liquid refers to the zeta potential of the semiconducting carbon nanotube dispersion liquid containing a nonionic surfactant and the micelle of the semiconducting carbon nanotubes obtained through, for example, the separation step by the above ELF method.

As used herein, the zeta potential of the carbon nanotube dispersion liquid is a value obtained by measuring the dispersion liquid using an ELSZ apparatus (Otsuka Electronics Co., Ltd.).

To form the carbon nanotube alignment layer, the concentration of the carbon nanotubes in the carbon nanotube dispersion liquid to be provided on the lower substrate is preferably 0.0003 wt % or more and 10 wt % or less, and more preferably 0.001 wt % or more and 1 wt % or less.

The surfactant, the solvent and the like can be removed from the carbon nanotube alignment layer by heat treatment. The temperature of the heat treatment may be appropriately set as long as it is equal to or higher than the decomposition temperature of the surfactant, and it is preferably 150 to 400° C., and more preferably 200 to 400° C. A temperature of 200° C. or more is preferred because the remaining of the decomposition product of the surfactant can be easily suppressed. A temperature of 400° C. or less is preferred because the change in the quality of the substrate can be suppressed. Also, the decomposition of carbon nanotubes, the change in size, the leaving of functional groups, and the like can be suppressed. The surfactant may be removed with a solvent. The solvent may be used as appropriate, but water, ethanol, a mixed solution thereof and the like are preferable.

The first electrode and the second electrode on the substrate 1 can be produced using gold, platinum, and titanium singly or in combination. The method for producing the electrode is not particularly limited, and examples thereof include vapor deposition, sputtering, and printing method. The thickness may be appropriately adjusted and is preferably 10 nm to 1 mm, and more preferably 50 nm to 1 µm.

In the bolometer of the present embodiment, the electrode distance thereof (the distance between the first electrode and the second electrode) is not particularly limited, and is preferably 1 µm to 500 µm, more preferably 10 µm to 500 µm, and for miniaturization, more preferably 5 to 200 µm. When the distance is 1 µm or more, a reduction in the nature of TCR can be suppressed, even in the case of containing a small amount of metallic carbon nanotubes. In addition, a distance of 500 µm or less is advantageous when the bolometer is applied to an image sensor by two-dimensional arraying the bolometers.

A protective film (protective layer) may be provided on the surface of the carbon nanotube layer, if necessary. When a bolometer is used as an infrared sensor, the protective film is preferably a material with high transparency in the infrared wavelength range to be detected. Examples thereof include acrylic resins such as PMMA, epoxy resins, and Teflon.

The bolometer having the carbon nanotube film according to the present embodiment may be a single element or may be an array in which a plurality of elements are two-dimensionally arranged such as those used in an image sensor.

After the above alignment layer of semiconducting carbon nanotubes is formed on the substrate, for example, the bolometer of the present embodiment can be manufactured as follows. The first electrode and the second electrode are produced by gold vapor-deposition at a distance of 50 µm over a thin layer of aligned carbon nanotubes. At this time, the electrodes are installed so that the alignment direction of carbon nanotubes and the current direction flowing between the first electrode and the second electrode can be substantially in parallel. An acrylic resin (PMMA) solution is applied to the region between the electrodes formed on the alignment layer of carbon nanotubes to form a protective layer made of PMMA. Thereafter, the entire substrate is subjected to oxygen plasma treatment to remove the excess carbon nanotubes and the like on the region other than the carbon nanotube layer 3. Excess solvents, impurities, and the like are removed by heating in an atmosphere at 200° C.

In one aspect of the present embodiment, the carbon nanotube dispersion liquid used in the method for manufacturing the carbon nanotube alignment layer is not limited to those containing semiconducting carbon nanotubes. That is, according to the present embodiment, a carbon nanotube layer (film) having a high degree of alignment can be obtained regardless of the type of carbon nanotubes.

One aspect of the present embodiment relates to a carbon nanotube film containing 90% by mass or more of semiconducting carbon nanotubes based on the total amount of carbon nanotubes, and having an alignment satisfying fx/fy≥2 where an integrated value f of amplitudes of frequencies from −1 µm$^{-1}$ to +1 µm$^{-1}$ in one direction from the center is calculated in an image obtained by performing two-dimensional fast Fourier transform processing on an SEM image of the carbon nanotube film, and an integrated value for a direction x in which the integrated value f becomes maximum is defined as fx, and an integrated value for a direction y perpendicular to the direction x is defined as fy.

This application is based upon and claims the benefit of priority from Japanese patent application No. 2019-096953, filed on May 23, 2019, the disclosure of which is incorporated herein in its entirety by reference.

EXAMPLES

The present invention will be described further in detail by way of Examples below, but the present invention should not be limited by the following examples.

Example 1

(Step 1)

100 mg of single-walled carbon nanotubes (Meijo Nano Carbon Co., Ltd., EC 1.0 (diameter: about 1.1 to 1.5 nm (average diameter 1.2 nm)) was put in a quartz boat and heat treatment was performed under a vacuum atmosphere using an electric furnace. It was performed at a heat treatment temperature of 900° C. for 2 hours. The weight after heat treatment was reduced to 80 mg, and it was found that the surface functional groups and impurities were removed. After the obtained single-walled carbon nanotubes were fractured with tweezers, 12 mg of which was immersed in 40 ml of an aqueous solution of 1 wt % surfactant (polyoxyethylene (100) stearyl ether) and after sufficient sedimentation, the mixture was subjected to ultrasonic dispersion treatment (BRANSON ADVANCED-DIGITAL SONIFIER apparatus (output: 50 W)) for 3 hours. Through this step, aggregates of the carbon nanotubes in the solution were eliminated. Thereafter, ultracentrifugation treatment was performed under conditions of 50000 rpm at 10° C. for 60 minutes. Through this procedure, bundles, remaining catalysts, and the like were removed to obtain a carbon nanotube dispersion liquid. At this point, the dispersion liquid was applied on a SiO$_2$ substrate and dried at 100° C., which was then observed by an atomic force microscope (AFM). As a result, it was found that 70% of the single-walled carbon nanotubes had a length within a range of 500 nm to 1.5 µm and the average length thereof was approximately 800 nm.

(Step 2)

Figure 7:
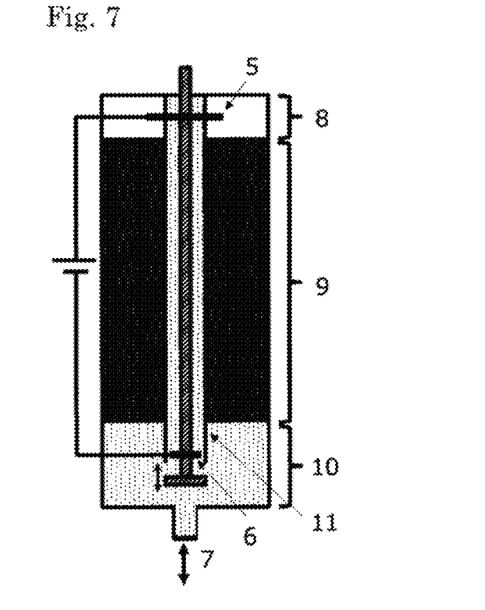
FIG. 7 is a schematic view of the constitution of the carbon nanotube separation apparatus used in Example.

The carbon nanotube dispersion liquid obtained by the Step 1 was introduced into the separation apparatus of FIG. 7. Here, water 8 (about 15 ml), carbon nanotube dispersion liquid 9 (about 70 ml), 2 wt % aqueous surfactant solution 10 (about 15 ml) were put in from the inlet with inner tube 11 closed, and thereafter, 2 wt % aqueous surfactant solution (about 20 ml) was put into inner tube 11. Thereafter, inner tube 11 was opened, resulting in a three-layer structure as shown in FIG. 7. A voltage of 120 V was applied, and semiconducting carbon nanotubes were transferred towards the anode side. On the other hand, metallic carbon nanotubes were transferred towards the cathode side. After 80 hours from the start of separation, they were separated cleanly. The separation step was carried out at room temperature (about 25° C.). When the carbon nanotube dispersion liquid transferred to the anode side was recovered and analyzed using the light absorption spectrum, it was found that the metallic carbon nanotubes components were removed. It was also found from the Raman spectrum that 99 wt % of the carbon nanotubes in the carbon nanotube dispersion liquid transferred to the anode side were semiconducting carbon nanotubes. The most frequent diameter of the single-walled carbon nanotubes was about 1.2 nm (70% or more), and the average diameter was 1.2 nm.

The above carbon nanotube dispersion liquid containing 99 wt % of the semiconducting carbon nanotubes (the carbon nanotube dispersion liquid transferred to the anode side) was prepared into a carbon nanotube dispersion liquid A which was adjusted so that the concentration of the carbon nanotubes in the dispersion liquid can be 0.01 wt % (simply referred to as the "dispersion liquid A"). This dispersion liquid A was used in the formation of a carbon nanotube layer.

(Step 3)

Subsequently, an alignment layer in which carbon nanotubes are aligned was formed using the dispersion liquid of the semiconducting carbon nanotubes obtained in the above step 2 with the apparatus illustrated in FIG. 2 and FIG. 3. As the lower substrate 21, a substrate obtained by forming a 500 nm polyimide film on a silicon substrate was prepared. This lower substrate 21 was washed by being sequentially immersed in isopropyl alcohol and ultrapure water, and being subjected to sonication. The washed lower substrate 21 was dried with nitrogen, and then subjected to UV ozone surface modification treatment for 1 minute. The carbon nanotube dispersion liquid A (about 0.1 ml) was added dropwise on the lower substrate 21 to form a liquid film. As the upper substrate 22, a silicon substrate (a substrate having a first straight side 26 with a length of 38 mm) was placed thereover so that the first side can be in contact with the liquid film, thereby forming the edge of the dispersion liquid A along the first side 26. The opposing planes of the upper substrate 22 and the lower substrate 21 are installed so as to be parallel to each other, and the distance between the planes of these substrates was set to be 100 µm using a spacer. In addition, a moving jig 23 was provided on the upper surface of the upper substrate (silicon substrate) 22, as illustrated in FIG. 3. Subsequently, the silicon substrate was moved at a speed of about 0.005 mm/second in a direction perpendicular to the first side 26 of the silicon substrate and toward the inside of the silicon substrate (the moving direction 30 of FIG. 4 and FIG. 5), and water was gradually evaporated from near the edge along the first side (see FIG. 5). Thereafter, this was heated in the atmosphere at 200° C. to remove the nonionic surfactant, the solvent, and the like in the dispersion liquid A. A scanning electron microscope image of the obtained carbon nanotube layer is shown FIG. 6. It was observed that carbon nanotubes are aggregated with a high degree of alignment. The thickness of the carbon nanotube layer 3 was measured by AFM, and the thickness was 50 nm. The number density of the carbon nanotubes in the carbon nanotube layer 3 was 300 nanotubes/µm$^2$.

(Manufacture of Bolometer)

Subsequently, gold as the first electrode and the second electrode was vapor deposited on the lower substrate 21 on which the carbon nanotube alignment layer obtained in the above step 3 was formed to have a thickness of 300 nm and a distance of 50 µm. At this time, the electrodes are installed so that the alignment direction of the carbon nanotubes in the carbon nanotube alignment layer and the direction of current flow between the electrodes can be substantially in parallel. Then, a PMMA anisole solution was applied between the electrodes to protect the carbon nanotubes between the electrodes, and then, excess carbon nanotubes and the like near the electrodes were removed by oxygen plasma treatment. Thereafter, the substrate was dried under the conditions of 200° C. for 1 hour.

(Measurement of Alignment)

FIG. 8A2 is an image (FFT image) obtained by performing two-dimensional fast Fourier transform processing on an SEM image (FIG. 8A1) of the carbon nanotube layer 3 obtained in Example 1. In the FFT image, a value obtained by integrating amplitudes of frequencies from $-1\ \mu m^{-1}$ to $+1\ \mu m^{-1}$ in one direction from the center was defined as an integrated value f, a direction in which f becomes maximum is defined as a direction x, and a direction perpendicular to the direction x is defined as a direction y. In FIG. 8A2, the horizontal direction is the direction x. A value obtained by integrating amplitudes of frequencies from $-1\ \mu m^{-1}$ to $+1\ \mu m^{-1}$ in the horizontal direction from the center (direction x) was defined as fx and a value obtained by integrating amplitudes of frequencies from $-1\ \mu m^{-1}$ to $+1\ \mu m^{-1}$ in the vertical direction from the center (direction y) was defined as fy, and then fx/fy was calculated and found to be 2.8.

Comparative Example 1

The carbon nanotube dispersion liquid A (the concentration of carbon nanotubes is 0.01 wt %) was prepared in the same manner as in step 1 and step 2 of Example 1. After the same substrate as the lower substrate in step 3 of Example 1 was washed, dried, and subjected to oxygen plasma treatment, the carbon nanotube dispersion liquid A (about 0.1 ml) was added dropwise several times, which was dried as it was, and then heated in the atmosphere at 200° C. to remove the nonionic surfactant, the solvent, and the like. The thickness of the carbon nanotube layer 3 was measured by AFM, and the thickness was 50 nm. The number density of the carbon nanotubes in the carbon nanotube layer 3 was 450 nanotubes/$\mu m^2$. Thereafter, gold was vapor deposited on two points on the substrate to have a thickness of 300 nm and a distance of 50 µm. Then, a PMMA anisole solution was applied between the electrodes to protect the carbon nanotubes between the electrodes, and then, excess carbon nanotubes and the like near the electrodes were removed by oxygen plasma treatment. Thereafter, the substrate was dried at 200° C. for 1 hour.

Figure 8B:
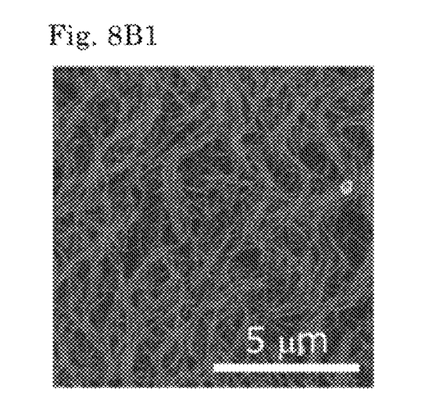
Figure 8B:
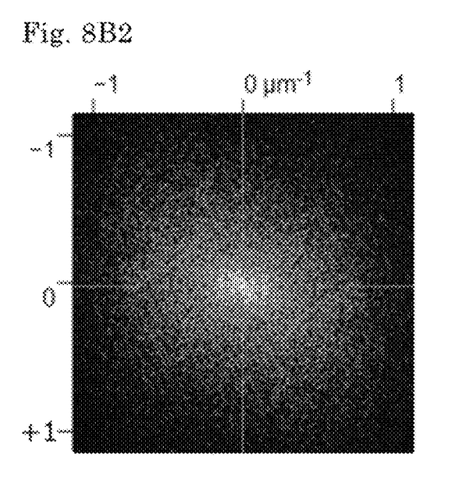

FIG. 8B2 is an image (FFT image) obtained by performing two-dimensional fast Fourier transform processing on an SEM image (FIG. 8B1) of the carbon nanotube layer obtained in Comparative Example 1. fx/fy was calculated in the same manner as in Example 1 and found to be 1.2.

Table 1 shows the degrees of alignment (fx/fy), measurement results of film resistance at 300 K, and TCR values in a region at 20 to 40° C. of each carbon nanotube layer obtained in Example 1 and Comparative Example 1. The bolometer having the carbon nanotube layer of Example 1 had a larger TCR value than the bolometer having the carbon nanotube layer of Comparative Example 1. In addition, it was found that the resistance value of the alignment film of Example 1 was an order of magnitude lower than that of Comparative Example 1. This is because the alignment of carbon nanotubes increased the contact area of the conductive paths between carbon nanotubes in Example 1.

TABLE 1

|  | Example 1 | Comparative Example 1 |
|---|---|---|
| fx/fy | 2.8 | 1.2 |
| Film Resistance (Ω) | $1 \times 10^8$ | $2 \times 10^9$ |
| TCR(%/K) | −5.5 | −5.1 |

The whole or part of the example embodiments disclosed above can be described as, but not limited to, the following supplementary notes.

(Supplementary Note 1)

A bolometer comprising:
a substrate;
a first electrode on the substrate;
a second electrode spaced from the first electrode on the substrate; and a carbon nanotube layer electrically connected to the first electrode and the second electrode, wherein
the carbon nanotube layer comprises 90% by mass or more of semiconducting carbon nanotubes based on the total amount of carbon nanotubes, and
the carbon nanotube layer has an alignment satisfying:

$$fx/fy \geq 2$$

where an integrated value f of amplitudes of frequencies from $-1\ \mu m^{-1}$ to $+1\ \mu m^{-1}$ in one direction from the center is calculated in an image obtained by performing two-dimensional fast Fourier transform processing on an SEM image of the carbon nanotube layer, and an integrated value for a direction x in which the integrated value f becomes maximum is defined as fx and an integrated value for a direction y perpendicular to the direction x is defined as fy.

(Supplementary Note 2)

The bolometer according to the Supplementary note 1, wherein carbon nanotubes between the first electrode and the second electrode have diameters ranging from 0.6 to 1.5 nm and lengths ranging from 100 nm to 5 µm.

(Supplementary Note 3)

The bolometer according to the Supplementary note 1 or 2, wherein an electrode distance between the first electrode and the second electrode is 10 µm to 500 µm.

(Supplementary Note 4)

The bolometer according to any one of the Supplementary notes 1 to 3, wherein a thickness of the carbon nanotube layer is 1 nm to 1 µm.

(Supplementary Note 5)

The bolometer according to any one of the Supplementary notes 1 to 4, wherein a number density of the semiconducting carbon nanotubes of the carbon nanotube layer is 1 nanotube/$\mu m^2$ to 1,000 nanotubes/$\mu m^2$.

(Supplementary Note 6)

The bolometer according to any one of the Supplementary notes 1 to 5, wherein the semiconducting carbon nanotubes have at least one selected from a carboxyl group, a carbonyl group, and a hydroxyl group being surface functional groups at at least one of the surface or the end.

(Supplementary Note 7)

An infrared sensor comprising the bolometer according to any one of the Supplementary notes 1 to 6.

(Supplementary Note 8)

A method for manufacturing a bolometer having a carbon nanotube layer, comprising the steps of:
preparing a carbon nanotube dispersion liquid comprising semiconducting carbon nanotubes in a proportion of 90% by mass or more based on the total amount of carbon nanotubes;

preparing a lower substrate, and an upper substrate having a first side being a straight line;
providing a liquid film of the carbon nanotube dispersion liquid on the lower substrate;
sandwiching the liquid film by the lower substrate and the upper substrate to form an edge of the liquid film along the first side; and
moving the upper substrate and/or the lower substrate so that a relative moving direction of the upper substrate with respect to the lower substrate is perpendicular to the first side and toward the inside of the plane of the upper substrate.

(Supplementary Note 9)

A method for manufacturing a carbon nanotube film, comprising:
preparing a lower substrate, and an upper substrate having a first side being a straight line;
providing a liquid film of a carbon nanotube dispersion liquid on the lower substrate;
sandwiching the liquid film by the lower substrate and the upper substrate to form an edge of the liquid film along the first side; and
moving the upper substrate and/or the lower substrate so that a relative moving direction of the upper substrate with respect to the lower substrate is perpendicular to the first side and toward the inside of the plane of the upper substrate.

(Supplementary Note 10)

A carbon nanotube film comprising semiconducting carbon nanotubes, wherein
the content of the semiconducting carbon nanotubes based on the total amount of carbon nanotubes is 90% by mass or more; and
the carbon nanotube film has an alignment satisfying:

$$fx/fy \geq 2$$

where an integrated value f of amplitudes of frequencies from $-1\ \mu m^{-1}$ to $+1\ \mu m^{-1}$ in one direction from the center is calculated in an image obtained by performing two-dimensional fast Fourier transform processing on an SEM image of the carbon nanotube film, and an integrated value for a direction x in which the integrated value f becomes maximum is defined as fx and an integrated value for a direction y perpendicular to the direction x is defined as fy.

While the invention has been described with reference to example embodiments and examples thereof, the invention is not limited to these embodiments and examples. Various changes that can be understood by those of ordinary skill in the art may be made to form and details of the present invention without departing from the spirit and scope of the present invention.

EXPLANATION OF REFERENCE

1 Substrate
2 Electrode 1 (first electrode)
3 Carbon nanotube layer
4 Electrode 2 (second electrode)
5 Cathode
6 Anode
7 Inlet/Outlet
8 Water
9 Carbon nanotube dispersion liquid
10 Surfactant solution
11 Inner tube
21 Lower substrate
22 Upper substrate
23 Moving jig
24 Carbon nanotube dispersion liquid
25 Edge
26 First side
30 Moving direction
31 Carbon nanotube
32 Evaporation rate
33 Capillary flow

What is claimed is:

1. A bolometer comprising:
a substrate;
a first electrode on the substrate;
a second electrode spaced from the first electrode on the substrate; and
a carbon nanotube film electrically connected to the first electrode and the second electrode, wherein
the carbon nanotube film consists of carbon nanotubes and comprises 90% by mass or more of semiconducting carbon nanotubes based on the total amount of carbon nanotubes,
a change in electrical resistance of the carbon nanotube film is caused by a temperature change, and
the carbon nanotube film has an alignment satisfying:

$$fx/fy \geq 2$$

where an integrated value f of amplitudes of frequencies from $-1\ \mu m^{-1}$ to $+1\ \mu m^{-1}$ in one direction from the center is calculated in an image obtained by performing two-dimensional fast Fourier transform processing on an SEM image of the carbon nanotube film, and an integrated value for a direction x in which the integrated value f becomes maximum is defined as fx and an integrated value for a direction y perpendicular to the direction x is defined as fy.

2. The bolometer according to claim 1, wherein carbon nanotubes between the first electrode and the second electrode have diameters ranging from 0.6 to 1.5 nm and lengths ranging from 100 nm to 5 μm.

3. The bolometer according to claim 1, wherein an electrode distance between the first electrode and the second electrode is 10 μm to 500 μm.

4. The bolometer according to claim 1, wherein a thickness of the carbon nanotube film is 1 nm to 1 μm.

5. The bolometer according to claim 1, wherein a number density of the semiconducting carbon nanotubes of the carbon nanotube film is 1 nanotube/μm² to 1,000 nanotubes/μm².

6. The bolometer according to claim 1, wherein the semiconducting carbon nanotubes have at least one selected from a carboxyl group, a carbonyl group, and a hydroxyl group being surface functional groups at at least one of the surface or the end.

7. An infrared sensor comprising the bolometer according to claim 1.

8. A method for manufacturing a bolometer having a carbon nanotube film, comprising:
preparing a carbon nanotube dispersion liquid comprising semiconducting carbon nanotubes in a proportion of 90% by mass or more based on the total amount of carbon nanotubes;
preparing a lower substrate, and an upper substrate having a first side being a straight line;
providing a liquid film of the carbon nanotube dispersion liquid on the lower substrate;

sandwiching the liquid film by the lower substrate and the upper substrate to form an edge of the liquid film along the first side; and moving the upper substrate and/or the lower substrate at a moving speed of 0.001 mm/second to 0.05 mm/second so that a relative moving direction of the upper substrate with respect to the lower substrate is perpendicular to the first side and toward the inside of the plane of the upper substrate, wherein the carbon nanotube film consists of carbon nanotubes and a change in electrical resistance of the carbon nanotube film is caused by a temperature change.

9. The bolometer according to claim 2, wherein the carbon nanotubes between the first electrode and the second electrode have lengths ranging from 100 nm to 1.5 μm.

10. The method for manufacturing a bolometer according to claim 8, wherein moving the upper substrate and/or the lower substrate is performed under conditions that a temperature of the substrate is 10° C. to 50° C., a relative humidity is 15% RH to 50% RH and an environmental pressure is standard atmospheric pressure (1013.25 hPa) or less.

11. The method for manufacturing a bolometer according to claim 8, wherein the carbon nanotube film has an alignment satisfying:

$$fx/fy \geq 2$$

where an integrated value f of amplitudes of frequencies from $-1$ $\mu m^{-1}$ to $+1$ $\mu m^{-1}$ in one direction from the center is calculated in an image obtained by performing two-dimensional fast Fourier transform processing on an SEM image of the carbon nanotube film, and an integrated value for a direction x in which the integrated value f becomes maximum is defined as fx and an integrated value for a direction y perpendicular to the direction x is defined as fy.

12. The method for manufacturing a bolometer according to claim 8, wherein the carbon nanotubes have diameters ranging from 0.6 to 1.5 nm and lengths ranging from 100 nm to 5 μm.

13. The method for manufacturing a bolometer according to claim 12, wherein the carbon nanotubes have lengths ranging from 100 nm to 1.5 μm.

14. The method for manufacturing a bolometer according to claim 8, wherein a distance between the opposing surfaces of the upper substrate and the lower substrate is 0.1 μm or more and 500 μm or less.

* * * * *